(12) United States Patent
Park et al.

(10) Patent No.: US 10,205,147 B2
(45) Date of Patent: *Feb. 12, 2019

(54) COMPOSITION FOR HEAT-RESISTANT POROUS LAYER, SEPARATOR, ELECTROCHEMICAL BATTERY, AND METHOD FOR FABRICATING THE SAME

(71) Applicant: SAMSUNG SDI CO., LTD., Yongin-si, Gyeonggi-do (KR)

(72) Inventors: Jin Kyu Park, Suwon-si (KR); Jong Sup Choi, Suwon-si (KR); Hyeon Sun Choi, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 264 days.

This patent is subject to a terminal disclaimer.

(21) Appl. No.: 14/984,205

(22) Filed: Dec. 30, 2015

(65) Prior Publication Data

US 2016/0190537 A1 Jun. 30, 2016

(30) Foreign Application Priority Data

Dec. 30, 2014 (KR) ........................ 10-2014-0194394

(51) Int. Cl.
*H01M 2/16* (2006.01)
*H01M 2/14* (2006.01)
(Continued)

(52) U.S. Cl.
CPC ...... *H01M 2/1653* (2013.01); *C08G 65/3322* (2013.01); *H01M 2/145* (2013.01);
(Continued)

(58) Field of Classification Search
CPC .... H01M 2/1653; H01M 2/145; H01M 2/166; H01M 2/1686; H01M 10/0525; H01M 10/052
(Continued)

(56) References Cited

U.S. PATENT DOCUMENTS 6,126,772 A 10/2000 Yamamoto et al.
7,422,826 B2 9/2008 Xing et al.
(Continued)

FOREIGN PATENT DOCUMENTS

CN 1770540 A 5/2006
CN 101621134 1/2010
(Continued)

OTHER PUBLICATIONS https://americas.sartomer.com/techlitdetail.asp?plid=1&sgid=5&prid=SR494 accessed on Feb. 5, 2018.*
(Continued)

*Primary Examiner* — Cynthia H Kelly
*Assistant Examiner* — Rashid A Alam
(74) *Attorney, Agent, or Firm* — Lee & Morse, P.C.

(57) ABSTRACT

A heat resistant porous layer composition for a separator of an electrochemical battery includes a compound represented by Formula 1, an initiator, and a solvent,

[Formula 1]

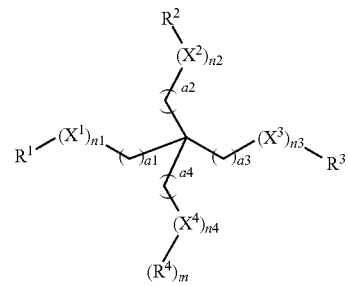

wherein Formula 1 is defined herein.

15 Claims, 1 Drawing Sheet

(51) Int. Cl.
*H01M 10/0525* (2010.01)
*C08G 65/332* (2006.01)
*H01M 10/052* (2010.01)

(52) U.S. Cl.
CPC ......... *H01M 2/166* (2013.01); *H01M 2/1686* (2013.01); *H01M 10/0525* (2013.01); *H01M 10/052* (2013.01)

(58) Field of Classification Search
USPC .......................................................... 429/144
See application file for complete search history.

(56) References Cited

U.S. PATENT DOCUMENTS

| | | | |
|---|---|---|---|
| 2009/0246651 A1 | 10/2009 | Fujimori et al. | |
| 2010/0304205 A1* | 12/2010 | Jo | H01G 9/02 429/144 |
| 2013/0157107 A1* | 6/2013 | Chung | H01M 2/1686 429/144 |
| 2013/0224559 A1* | 8/2013 | Furutani | H01M 2/145 429/211 |
| 2013/0236766 A1* | 9/2013 | Seo | H01M 2/145 429/144 |
| 2015/0111086 A1* | 4/2015 | Arnold | H01M 2/1686 429/144 |
| 2015/0140404 A1* | 5/2015 | Yoo | H01M 2/1653 429/145 |
| 2015/0303428 A1* | 10/2015 | Sawada | H01M 2/1653 429/145 |
| 2017/0051116 A1 | 2/2017 | Takahashi et al. | |

FOREIGN PATENT DOCUMENTS

| | | |
|---|---|---|
| CN | 102903953 A | 1/2013 |
| JP | 2008-210791 A | 9/2008 |
| KR | 10-0775310 B1 | 11/2007 |
| KR | 10-2008-0058197 A | 6/2008 |
| KR | 10-2009-0056811 A | 6/2009 |
| KR | 10-2010-0119888 A | 11/2010 |
| KR | 10-1002161 B1 | 12/2010 |
| KR | 10-1135500 B1 | 4/2012 |
| KR | 10-2013-0092245 A | 8/2013 |
| KR | 10-1430975 B1 | 8/2014 |
| KR | 10-2014-0145450 A | 12/2014 |
| KR | 10-1551757 B1 | 9/2015 |
| WO | WO 2014/200198 A | 12/2014 |

OTHER PUBLICATIONS

Extended European Search Report dated Apr. 12, 2016 in Corresponding European Patent Application No. 15203118.3.
Extended European Search Report dated Apr. 12, 2016 in Corresponding European Patent Application No. 15202955.9.
Chinese Office Action dated Jun. 8, 2017, of the corresponding Chinese Patent Application No. 201511016177.1.
U.S. Office Action received in copending U.S. Appl. No. 14/984,067 dated Feb. 23, 2018.
Chinese Office Action dated May 28, 2018 and Chinese Search Report dated May 15, 2018 received in copending related U.S. Appl. No. 14/984,067.
C. Slugove, Polymerization Mechanisms, Feb. 14, 2011, pp. 1-16.
European Office Action dated Feb. 28, 2018, issued in Application No. 15203118.3.
European Office Action received in copending related U.S. Appl. No. 14/984,067 dated Feb. 28, 2018.
U.S. Appl. No. 14/984,067, filed Dec. 30. 2015.

* cited by examiner

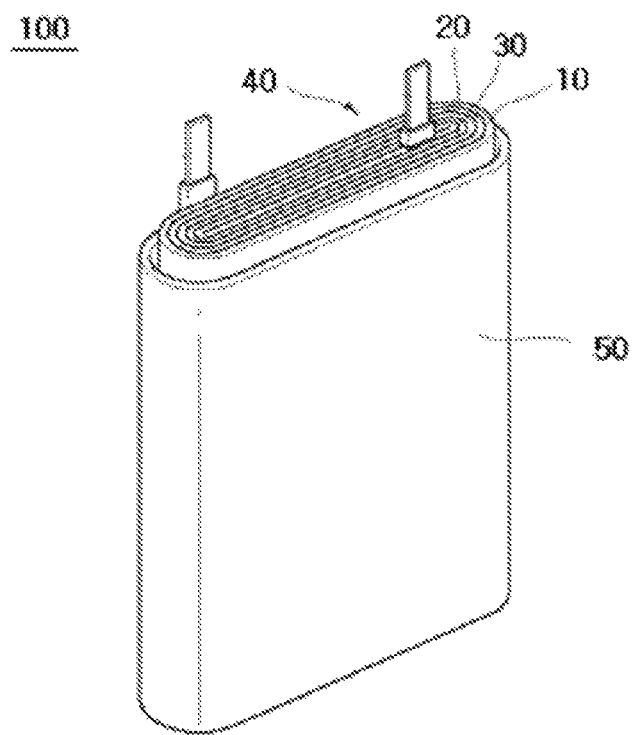

COMPOSITION FOR HEAT-RESISTANT POROUS LAYER, SEPARATOR, ELECTROCHEMICAL BATTERY, AND METHOD FOR FABRICATING THE SAME

CROSS-REFERENCE TO RELATED APPLICATION

Korean Patent Application No. 10-2014-0194394, filed on Dec. 30, 2014, in the Korean Intellectual Property Office, and entitled: "Composition for Heat-Resistant Porous Layer, Separator Comprising the Same, Electrochemical Battery Using the Same, and Method for Fabricating the Same," is incorporated by reference herein in its entirety.

BACKGROUND

1. Field

Embodiments relate to a heat resistant porous layer composition, a separator, an electrochemical battery, and a method for fabricating the separator.

2. Description of the Related Art

A separator for an electrochemical battery refers to an intermediate film which isolates an anode from a cathode in a battery and consistently maintains ionic conductivity, thereby allowing charging/discharging of the battery.

SUMMARY

Embodiments are directed to a heat resistant porous layer composition for a separator of an electrochemical battery, the composition including a compound represented by Formula 1, an initiator, and a solvent,

[Formula 1]

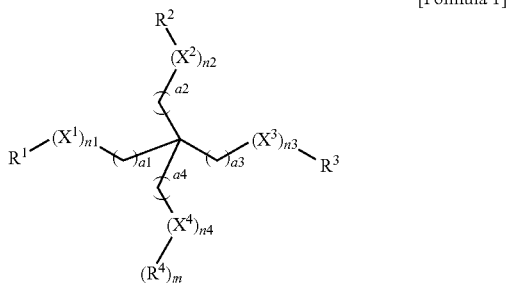

In Formula 1, $X^1$ to $X^3$ may each independently be an oxyethylene group, $X^4$ may be an oxyethylene group or a $C_1$ to $C_{10}$ alkyl group, $R^1$ to $R^4$ may each independently be a (meth)acrylate group, a hydroxy group, a carboxyl group, an ester group, a cyanate group, an isocyanate group, an amino group, a thiol group, a $C_1$ to $C_{10}$ alkoxy group, a vinyl group, or a heterocyclic group, $a^1$ to $a^4$ may each independently be an integer from 1 to 10, and $n^1$ to $n^3$ may each independently be an integer from 0 to 10. At least one of $n^1$ to $n^4$ may be an integer from 1 to 10. When $X^4$ is an oxyethylene group, $n^4$ is an integer from 1 to 10 and m is 1, and when $X^4$ is a $C_1$ to $C_{10}$ alkyl group, $n^4$ is 1 and m is 0.

The composition may further include inorganic particles.

The inorganic particles may be present in an amount of 50 wt % to 95 wt % based on the total weight of the composition in terms of solid content.

The composition may further include a binder resin other than the compound represented by Formula 1.

The binder resin may include one or more of a polyvinylidene fluoride (PVdF)-based polymer, a polymethylmethacrylate, a polyacrylonitrile, a polyvinylpyrrolidone, a polyvinylacetate, a polyethylene oxide, a cellulose acetate, a cellulose acetate butyrate, a cellulose acetate propionate, a cyanoethylpullulan, a cyanoethylpolyvinylalcohol, a cyanoethylcellulose, a cyanoethylsucrose, a pullulan, a carboxymethyl cellulose, or an acrylonitrile-butadiene-styrene copolymer.

The binder resin may include one or more of a polyvinylidene fluoride (PVdF)-based homopolymer or a polyvinylidene fluoride-hexafluoropropylene (PVdF-HFP)-based copolymer.

A weight ratio of the compound represented by Formula 1 to the binder resin may range from 8:2 to 2:8.

Embodiments are also directed to a separator for an electrochemical battery, the separator including a porous substrate; and a heat resistant porous layer formed on one or both surfaces of the porous substrate using the composition according to an embodiment.

Embodiments are also directed to a separator for an electrochemical battery, the separator including a porous substrate, and a heat resistant porous layer formed on one or both surfaces of the porous substrate. The heat resistant porous layer may include crosslinked binder, and the separator may have a tensile strength of 50 kgf/cm$^2$ to 350 kgf/cm$^2$, as measured after being left at 200° C. for 10 minutes.

The separator may not suffer from fracture after being left at 200° C. for 10 minutes.

The crosslinked binder may be formed by being crosslinked a compound represented by Formula 1:

[Formula 1]

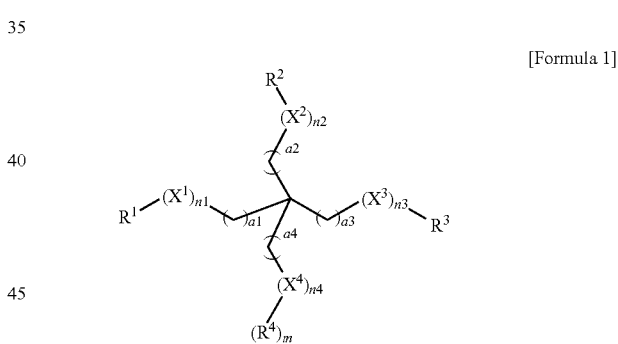

In Formula 1, $X^1$ to $X^3$ may each independently be an oxyethylene group, $X^4$ may be an oxyethylene group or a $C_1$ to $C_{10}$ alkyl group, $R^1$ to $R^4$ may each independently be a (meth)acrylate group, a hydroxy group, a carboxyl group, an ester group, a cyanate group, an isocyanate group, an amino group, a thiol group, a $C_1$ to $C_{10}$ alkoxy group, a vinyl group, or a heterocyclic group, $a^1$ to $a^4$ may each independently be an integer from 1 to 10, and $n^1$ to $n^3$ may each independently be an integer from 0 to 10, at least one of $n^1$ to $n^4$ being an integer from 1 to 10. When $X^4$ is an oxyethylene group, $n^4$ an integer from 1 to 10 and m is 1, and when $X^4$ is a $C_1$ to $C_{10}$ alkyl group, $n^4$ is 1 and m is 0.

The heat resistant porous layer may further include inorganic particles.

The inorganic particles may be present in an amount of 50 wt % to 95 wt % based on the total weight of the heat resistant porous layer.

The heat resistant porous layer may further include a binder resin other than the crosslinked binder.

The binder resin may include one or more of a polyvinylidene fluoride (PVdF)-based polymer, a polymethylmethacrylate, a polyacrylonitrile, a polyvinylpyrrolidone, a polyvinylacetate, a polyethylene oxide, a cellulose acetate, a cellulose acetate butyrate, a cellulose acetate propionate, a cyanoethylpullulan, a cyanoethylpolyvinylalcohol, a cyanoethylcellulose, a cyanoethylsucrose, a pullulan, a carboxymethyl cellulose, or an acrylonitrile-butadiene-styrene copolymer.

The binder resin may include one or more of a polyvinylidene fluoride (PVdF)-based homopolymer or a polyvinylidene fluoride-hexafluoropropylene (PVdF-HFP)-based copolymer.

The separator may have an air permeability of 300 sec/100 cc or less.

The separator may have an adhesive strength to a substrate of 0.1 N or more.

The separator may have a thermal shrinkage of 10% or less in the MD and the TD, as measured after being left at 150° C. for 60 minutes.

Embodiments are also directed to an electrochemical battery, including an anode, a cathode, a separator, and an electrolyte, the separator being a separator according to an embodiment.

BRIEF DESCRIPTION OF THE DRAWINGS

Features will become apparent to those of skill in the art by describing in detail example embodiments with reference to the attached drawing, in which:

FIG. 1 illustrates an exploded perspective view of an electrochemical battery according to an example embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing FIGURE, the dimensions of layers and regions may be exaggerated for clarity of illustration. Like reference numerals refer to like elements throughout.

A separator according to an example embodiment includes a porous substrate and a heat resistant porous layer formed on one or both surfaces of the porous substrate.

The porous substrate may include any suitable porous substrate so long as the porous substrate has numerous pores and may be used in electrochemical devices. The porous substrate may be a polymer film formed of at least one of polyethylene, polypropylene, polyethylene terephthalate, polybutylene terephthalate, polyester, polyacetal, polyamide, polyimide, polycarbonate, polyether ether ketone, polyaryl ether ketone, polyetherimide, polyamideimide, polybenzimidazole, polyethersulfone, polyphenylene oxide, a cyclic olefin copolymer, polyphenylene sulfide, polyethylene naphthalene, and mixtures thereof, without being limited thereto. In another implementation, the porous substrate may take the form of a non-woven fabric. By way of example, the porous substrate may be a polyolefin-based substrate, which has excellent shutdown properties, thereby enhancing battery stability. The polyolefin-based substrate may be selected from a polyethylene monolayer, a polypropylene monolayer, a polyethylene/polypropylene bilayer, a polypropylene/polyethylene/polypropylene trilayer, and a polyethylene/polypropylene/polyethylene trilayer. By way of another example, the polyolefin-based resin may include a non-olefin resin in addition to an olefin resin, or may include a copolymer of olefin and non-olefin monomers. The porous substrate may have a thickness of 1 μm to 40 μm, e.g., 5 μm to 15 μm or 5 μm to 10 μm. Within this range of thickness of the porous substrate, it may be possible to fabricate a separator which has an appropriate thickness, that is, is thick enough to prevent short circuit between an anode and a cathode of a battery and is not so thick as to increase internal resistance of the battery.

The heat resistant porous layer may include a binder, which may include a crosslinked binder. The heat resistant porous layer may be formed from a heat resistant porous layer composition. The heat resistant porous layer composition may include a compound represented by Formula 1, an initiator, and a solvent. The compound represented by Formula 1 may be a monomer represented by Formula 1, an oligomer represented by Formula 1, a polymer represented by Formula 1, or a mixture thereof.

[Formula 1]

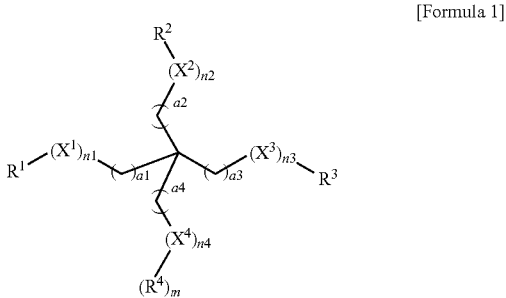

In Formula 1, $X^1$ to $X^3$ are each independently an oxyethylene group ($OCH_2CH_2$ or $CH_2CH_2O$); $X^4$ is an oxyethylene group or a $C_1$ to $C_{10}$ alkyl group; $R^1$ to $R^4$ are each independently any one selected from the group consisting of a (meth)acrylate group, a hydroxy group, a carboxyl group, an ester group, a cyanate group, an isocyanate group, an amino group, a thiol group, a $C_1$ to $C_{10}$ alkoxy group, a vinyl group, and a heterocyclic group; $a^1$ to $a^4$ are each independently an integer from 1 to 10; $n^1$ to $n^3$ are each independently an integer from 0 to 10; and at least one of $n^1$ to $n^4$ is an integer from 1 to 10 (when $X^4$ is an oxyethylene group, $n^4$ is an integer from 1 to 10 and m is 1, and when $X^4$ is a $C_1$ to $C_{10}$ alkyl group, $n^4$ is 1 and m is 0).

The ester group may be represented by —COOR; and the amino group may be represented by —$NR^aR^b$, where R, $R^a$ and $R^b$ may be each independently a $C_1$ to $C_{20}$ alkyl group, a $C_2$ to $C_{20}$ alkenyl group, a $C_2$ to $C_{20}$ alkynyl group, a $C_3$ to $C_{20}$ cycloalkyl group, a $C_3$ to $C_{20}$ cycloalkenyl group, a $C_4$ to $C_{20}$ cycloalkynyl group, and a $C_6$ to $C_{30}$ aryl group. In addition, the heterocyclic group may be any one of a $C_2$ to $C_{20}$ heterocyclo alkyl group, a $C_3$ to $C_{20}$ heterocyclo alkenyl group, a $C_3$ to $C_{20}$ heterocyclo alkynyl group, and a $C_6$ to $C_{20}$ heteroaryl group and may include a heteroatom selected from N, O, and S. For example, the heterocyclic group may include an epoxy group, an oxetane group, and the like.

For example, the monomer, oligomer, or polymer represented by Formula 1 may be a compound represented by Formula 2 or Formula 3.

[Formula 2]

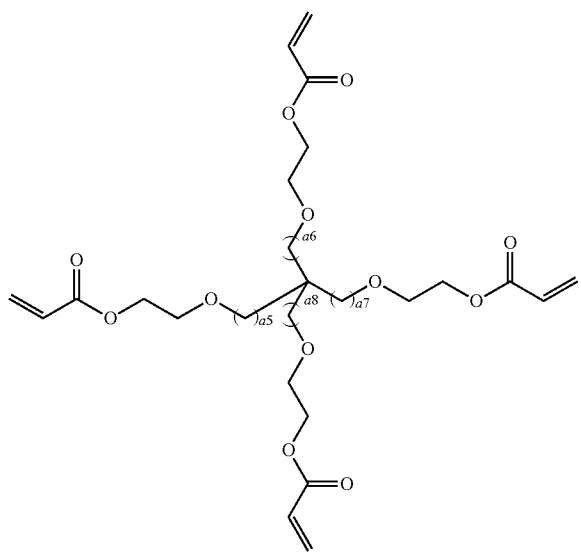

[Formula 3]

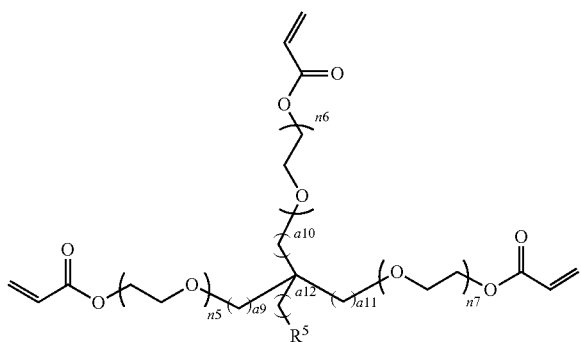

where $R^5$ may be a $C_1$ to $C_{10}$ alkyl group; $n^5$ to $n^7$ may be each independently an integer from 1 to 5; and $a^5$ to $a^{12}$ may be each independently an integer from 1 to 10.

Examples of a compound represented by Formula 1 may include ethoxylated pentaerythritol tetraacrylate and ethoxylated trimethylolpropane triacrylate, without being limited thereto.

The heat resistant porous layer may include a crosslinked binder formed by heat curing or photocuring the monomer, oligomer, or polymer. The crosslinked binder may enhance dimensional stability of the heat resistant porous layer and heat resistance of the separator. In addition, the separator may have excellent wettability to an electrolyte and thus may improve charging/discharging properties of a battery when used in the battery. Further, physical and chemical bonding between molecules constituting the binder may prevent binder components from being easily dissolved in an electrolyte.

The initiator serves to initiate crosslinking of the monomer, oligomer, or polymer of Formula 1 to form cross-links. The initiator may be properly selected depending upon the kind of a terminal reactive group of the monomer, oligomer, or polymer represented by Formula 1. For example, the initiator may include a thermal polymerization initiator such as peroxide, azo, amine, imidazole, or isocyanate initiators, or a photopolymerization initiator such as onium salts or organic metal salts. Examples of the peroxide initiator may include t-butyl peroxy laurate, 1,1,3,3-t-methylbutylperoxy-2-ethylhexanoate, 2,5-dimethyl-2,5-di(2-ethylhexanoylperoxy)hexane, 1-cyclohexyl-1-methylethylperoxy-2-ethylhexanoate, 2,5-dimethyl-2,5-di(m-toluoylperoxy)hexane, t-butyl peroxy isopropyl monocarbonate, t-butyl peroxy-2-ethylhexyl monocarbonate, t-hexyl peroxy benzoate, t-butyl peroxy acetate, dicumyl peroxide, 2,5,-dimethyl-2,5-di(t-butyl peroxy) hexane, t-butyl cumyl peroxide, t-hexyl peroxy neodecanoate, t-hexyl peroxy-2-ethyl hexanoate, t-butyl peroxy-2-2-ethylhexanoate, t-butyl peroxy isobutyrate, 1,1-bis(t-butyl peroxy)cyclohexane, t-hexyl peroxyisopropyl monocarbonate, t-butyl peroxy-3,5,5-trimethyl hexanoate, t-butyl peroxy pivalate, cumyl peroxy neodecanoate, di-isopropyl benzene hydroperoxide, cumene hydroperoxide, isobutyl peroxide, 2,4-dichloro benzoyl peroxide, 3,5,5-trimethyl hexanoyl peroxide, octanoyl peroxide, lauryl peroxide, stearoyl peroxide, succinic acid peroxide, benzoyl peroxide, 3,5,5-trimethyl hexanoyl peroxide, benzoyl peroxy toluene, 1,1,3,3-tetramethyl butyl peroxy neodecanoate, 1-cyclohexyl-1-methylethyl peroxy neodecanoate, di-n-propyl peroxy dicarbonate, di-isopropyl peroxy carbonate, bis (4-t-butyl cyclohexyl) peroxy dicarbonate, di-2-ethoxy methoxy peroxy dicarbonate, di(2-ethyl hexyl peroxy) dicarbonate, dimethoxy butyl peroxy dicarbonate, di(3-methyl-3-methoxy butyl peroxy) dicarbonate, 1,1-bis(t-hexyl peroxy)-3,3,5-trimethylcyclohexane, 1,1-bis(t-hexyl peroxy) cyclohexane, 1,1-bis(t-butyl peroxy)-3,3,5-trimethylcyclohexane, 1,1-(t-butyl peroxy)cyclododecane, 2,2-bis(t-butyl peroxy)decane, t-butyl trimethyl silyl peroxide, bis(t-butyl) dimethyl silyl peroxide, t-butyl triallyl silyl peroxide, bis(t-butyl) diallyl silyl peroxide, tris(t-butyl)allyl silyl peroxide, and the like. Examples of the azo initiator may include 2,2'-azobis(4-methoxy-2,4-dimethyl valeronitrile), dimethyl 2,2'-azobis(2-methyl propionate), 2,2'-azobis (N-cyclohexyl-2-methyl propionamide), 2,2-azobis(2,4-dimethyl valeronitrile), 2,2'-azobis(2-methyl butyronitrile), 2,2'-azobis[N-(2-propenyl)-2-methylpropionamide], 2,2'-azobis(N-butyl-2-methyl propionamide), 2,2'-azobis[N-(2-propenyl)-2-methyl propionamide], 1,1'-azobis(cyclohexane-1-carbonitrile), 1-[(cyano-1-methylethyl)azo] formamide, and the like. Examples of the isocyanate initiator may include polyisocyanates, such as an aliphatic polyisocyanate, alicyclic polyisocyanate, araliphatic polyisocyanate, aromatic polyisocyanate, and derivatives or modifiers thereof, and the like. For example, the isocyanate initiator may include trimethylenediisocyanate, tetramethylenediisocyanate, hexamethylenediisocyanate, pentamethylenediisocyanate, 1,2-propylenediisocyanate, 1,2-butylenediisocyanate, 2,3-butylenediisocyanate, 1,3-butylenediisocyanate, 2,4,4- or 2,2,4-trimethylhexamethylenediisocyanate, 2,6-diisocyanatemethylcaproate, lysine ester triisocyanate, 1,4,8-triisocyanateoctane, 1,6,11-triisocyanateundecane, 1,8-diisocyanate-4-isocyanatemethyloctane, 1,3,6-triisocyanatehexane, 2,5,7-trimethyl-1,8-diisocyanate-5-isocyanatemethyloctane, and the like. Examples of other thermal polymerization initiators may include benzophenone (BZP, Aldrich), 2,6-bis(azidobenzylidene)-4-methyl cyclohexanone (bisazido, Aldrich), 2,2-dimethoxy-2-phenylacetophenone, 1-benzoyl-1-hydroxycyclohexane, 2,4,6-trimethyl benzoyldiphenylphosphine oxide, 3-methyl-2-butenyltetramethylene sulfonium hexafluoroantimonate salt, ytterbium trifluoromethanesulfonate salt, samarium trifluoromethanesulfonate salt, erbium trifluoromethanesulfonate salt, dysprosium trifluoromethanesulfonate salt, lanthanum trifluoromethanesulfonate salt, tetrabutylphosphonium methanesulfonate salt, ethyltriphenylphosphonium bromide salt, benzyl dimethylamine, dimethylaminomethyl phenol, triethanolamine, 2-methyl imidazole, 2-ethyl-4-methyl imidazole, 1,8-diaza-bicyclo(5,4,0)undecene-7, triethylenediamine, tri-2,4-6-dimethyl aminomethyl phenol, and the like. Examples of the photopolymerization initiator may include aryl sulfonium hexafluoroantimonate salt, diphenyliodonium hexafluorophosphate salt, diphenyl diiodonium hexaantimonium salt, ditolyliodonium hexafluorophosphate salt, 9-(4-hydroxyethoxyphenyl)thianthrenium hexafluorophosphate salt, and the like.

The initiator may be present in an amount of 1 part by weight to 15 parts by weight, e.g., 3 parts by weight to 10 parts by weight based on 100 parts by weight of the compound represented by Formula 1. Within this range, the initiator may provide a desired crosslinking degree or curing degree.

In an embodiment, the composition may further include a crosslinking agent to adjust a degree of crosslinking, as needed. Examples of the crosslinking agent may include m- or p-divinylbenzene such as 1,4-cyclohexanediol dimethacrylate, and ethylene glycol dimethacrylate, without being limited thereto.

The solvent is not particularly limited so long as the solvent may dissolve the monomer, oligomer, or polymer and/or may sufficiently disperse inorganic particles. Examples of the solvent may include: $C_1$ to $C_{15}$ alcohols; hydrocarbon solvents such as aliphatic hydrocarbons, alicyclic hydrocarbons, and aromatic hydrocarbons; halogenated hydrocarbon solvents; ethers such as aliphatic ethers and alicyclic ethers; and mixtures thereof. For example, the solvent may include: ketones such as acetone, methylethyl ketone, methylbutyl ketone, methylisobutyl ketone, and cyclohexanone; ethers such as ethyl ether, dioxane, and tetrahydrobutane; esters such as methyl acetate, ethyl acetate, propyl acetate, isopropyl acetate, butyl acetate, isobutyl acetate, pentyl acetate, and isopentyl acetate; alcohols such as butanol, 2-butanol, isobutyl alcohol, isopropyl alcohol, ethanol, and methanol; halogenated hydrocarbons such as dichloromethane, chloroform, dichloroethane, trichloroethane, tetrachloroethane, dichloroethylene, trichloroethylene, tetrachloroethylene, and chlorobenzene; or hydrocarbons such as n-hexane, cyclohexanol, methylcyclohexanol, benzene, and toluene, and the like.

Next, a separator according to another example embodiment will be described. Since a separator according to this embodiment includes substantially the same components as the separator according to the above embodiment except that the heat resistant porous layer or the heat resistant porous layer composition further includes inorganic particles, the inorganic particles will be mainly described herein.

The inorganic particles are not particularly limited and may include any suitable inorganic particles. Examples of the inorganic particles may include $Al_2O_3$, $SiO_2$, $B_2O_3$, $Ga_2O_3$, $TiO_2$, and $SnO_2$, without being limited thereto. These may be used alone or as a mixture thereof. For example, the inorganic particles may include $Al_2O_3$ (alumina). Although the size of the inorganic particles is not particularly limited, the inorganic particles may have an average particle diameter of 1 nm to 2,000 nm, for example, 100 nm to 1,000 nm or 300 nm to 600 nm. Within this range, the inorganic particles may be prevented from suffering deterioration in dispersibility and processability in the heat resistant porous layer composition, and the thickness of the heat resistant layer may be properly adjusted, which may help prevent deterioration in mechanical properties and increase in electrical resistance. In addition, the size of pores generated in the heat resistant porous layer may be properly adjusted, thereby reducing possibility of occurrence of internal short circuit during charge/discharge of a battery.

The inorganic particles may be present in an amount of 50 wt % to 95 wt %, e.g., 60 wt % to 95 wt % or 75 wt % to 95 wt % based on the total weight of the heat resistant porous layer. Within this range, the inorganic particles may exhibit sufficient heat dissipation properties, thereby effectively suppressing thermal shrinkage of the separator when the separator is coated with the inorganic particles.

In preparation of the heat resistant porous layer composition, the inorganic particles may be added in the form of an inorganic dispersion in which the inorganic particles are dispersed in an appropriate solvent. Such a solvent is not particularly limited and may include any suitable solvent. For example, the solvent, in which the inorganic particles are dispersed, may include acetone. The inorganic dispersion may be prepared by any typical method, for example, by adding an appropriate amount of $Al_2O_3$ to acetone, followed by dispersion using a bead mill.

Next, a separator according to another example embodiment will be described. A separator according to this embodiment includes substantially the same components as the separator according to an example embodiment as set forth above, except that a heat resistant porous layer further includes a binder resin other than the crosslinked binder. Thus, the binder resin other than the crosslinked binder will be mainly described herein.

The heat resistant porous layer may exhibit further enhanced adhesion and heat resistance by further including the binder resin. For example, the binder resin may include a non-crosslinkable binder, which does not contain a crosslinkable functional group, for example, at least one of a polyvinylidene fluoride (PVdF)-based polymer, polymethylmethacrylate, polyacrylonitrile, polyvinylpyrrolidone, polyvinylacetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethyl cellulose, acrylonitrile-butadiene-styrene copolymer, and combinations thereof.

Here, the polyvinylidene fluoride-based polymer may be a polyvinylidene fluoride-based homopolymer, a polyvinylidene fluoride-based copolymer, or a mixture thereof.

The polyvinylidene fluoride-based homopolymer refers to a polymer obtained by polymerization of a vinylidene fluoride (VDF) monomer alone or by polymerization of a vinylidene fluoride monomer and 5 wt % or less of a monomer other than the vinylidene fluoride monomer. Here, the polyvinylidene fluoride-based homopolymer does not include a hexafluoropropylene (HFP) monomer as the monomer other than the vinylidene fluoride monomer. For example, the polyvinylidene-based fluoride homopolymer may include a unit originating from the vinylidene fluoride monomer alone, or may further include 5 wt % or less of a unit originating from the monomer other than the vinylidene fluoride monomer, wherein the unit originating from the monomer other than the vinylidene fluoride monomer does not include a unit originating from a hexafluoropropylene HFP monomer.

The polyvinylidene fluoride-based copolymer refers to a copolymer obtained by polymerization of a vinylidene fluoride monomer and a monomer other than the vinylidene fluoride monomer, for example, a copolymer including a unit originating from a hexafluoropropylene monomer in addition to a unit originating from a vinylidene fluoride monomer or a copolymer including greater than 5 wt % of a unit originating from a monomer other than the vinylidene fluoride monomer and the hexafluoropropylene monomer. The polyvinylidene fluoride-based copolymer may include a polyvinylidene fluoride-hexafluoropropylene (PVdF-HFP)-based copolymer including a unit originating from vinylidene fluoride and a unit originating from hexafluoropropylene. The polyvinylidene fluoride-hexafluoropropylene-based copolymer may include a polyvinylidene fluoride-hexafluoropropylene (PVdF-HFP)-based binary polymer or a ter- or more polymer further including units other than a unit originating from a vinylidene fluoride monomer and a unit originating from a hexafluoropropylene monomer. Although the above units are described as originating from monomers, embodiments are not limited thereto and the units may originate from oligomers and the like.

More specifically, the non-crosslinkable binder may be a polyvinylidene fluoride-based polymer, for example, a polyvinylidene fluoride-based homopolymer, a polyvinylidene fluoride-hexafluoropropylene-based copolymer, or a mixture thereof. The polyvinylidene fluoride-based homopolymer or the polyvinylidene fluoride-hexafluoropropylene-based copolymer may have a weight average molecular weight (Mw) of 400,000 g/mol to 1,700,000 g/mol. For example, the polyvinylidene fluoride-based homopolymer or the polyvinylidene fluoride-hexafluoropropylene-based copolymer may have a weight average molecular weight (Mw) of 400,000 g/mol to 1,200,000 g/mol. When a polyvinylidene fluoride-based binder having a weight average molecular weight in the above range is used, it may be possible to fabricate a battery which exhibits enhanced adhesion between the separator and the porous substrate even after charge/discharge of the battery, thereby providing efficient electrical output.

A weight ratio of the monomer, oligomer, or polymer represented by Formula 1 to the binder further included may range from 8:2 to 2:8, e.g., from 6.5:3.5 to 3.5:6.5. Within this range of weight ratio, desired heat resistance and adhesion of the heat resistant porous layer may be advantageously satisfied.

The separator according to an embodiments may have a tensile strength of 50 kgf/cm$^2$ to 350 kgf/cm$^2$, for example, 100 kgf/cm$^2$ to 350 kgf/cm$^2$, as measured after being left at 200° C. for 10 minutes. When the separator has a tensile strength of 50 kgf/cm$^2$ to 350 kgf/cm$^2$, as measured after being left at 200° C. for 10 minutes, the separator may not be fractured even when the internal temperature of a battery exceeds 200° C., which may help prevent deterioration in performance and safety of the battery. The tensile strength may be measured by the following method, without being limited thereto. First, the separator is cut to a size of 5 cm×5 cm in the MD and the TD, and all sides of the separator are fixed to a plate using an imide tape. Then, the plate is placed in an oven at 200° C. for 10 minutes, followed by stretching the separator using a tensile strength tester (3343, Instron Corporation) and measuring the tensile strength.

The separator according to example embodiments may avoid being fractured after being left at 200° C. for 10 minutes with all sides thereof fixed. A fracture resistance at high temperature of the separator may be evaluated by cutting the separator to a size of 5 cm×5 cm in the MD and the TD, fixing all sides of the separator to a plate using an imide tape, leaving the plate at 200° C. for 10 minutes, and checking whether the separator is fractured with the naked eye. The fracture resistance at high temperature refers to a property which allows the separator, all sides of which are fixed, to be resistant to being fractured without shrinking at high temperature. Since the separator is fixedly interposed between an anode and a cathode in a battery, the fracture resistance at high temperature may be usefully used as an index of heat resistance of the fixed separator.

The separator according to example embodiments may have an air permeability of 300 sec/100 cc or less, e.g., 200 sec/100 cc or less, or from 100 sec/100 cc to 200 sec/100 cc. The air permeability of the separator refers to the time (unit: seconds) that it takes 100 cc of air to pass through the separator, and may be measured using an instrument such as EG01-55-1MR (Asahi Seiko Co., Ltd.).

The separator according to example embodiments may have a thermal shrinkage of 10% or less in the machine direction (MD) or the transverse direction (TD), e.g., 7% or less, more e.g., 5% or less, as measured after being left at 150° C. for 60 minutes. The thermal shrinkage of the separator may be measured by any suitable method. The thermal shrinkage of the separator may be measured by the following method, without being limited thereto. The separator is cut into a specimen having a size of 5 cm×5 cm (width (MD)×length (TD)), and the specimen is left in a chamber at 150° C. for 60 minutes, followed by measuring the degree to which the separator shrinks in the MD and the TD and calculating the thermal shrinkage based on the measured values.

The separator according to example embodiments may have an adhesive strength to a porous substrate (hereinafter, "adhesive strength to a substrate") of 0.1 N or more, e.g., 0.2 N or more, more e.g., from 0.2 N to 10 N. When the separator has an adhesive strength to a substrate of 0.1 N or more, the heat resistant porous layer may exhibit excellent adhesion to a porous substrate, thereby maintaining battery performance for a long time. The adhesive strength to a substrate may be measured by a typical method (for example, ASTM-D903) without limitation. An example of the method for measuring the adhesive strength to a substrate of the separator is as follows: The separator is cut into a specimen having a size of 1.2 cm×5 cm (MD×TD), and the specimen is attached to a tape (Scotch, 3M Co., Ltd.) excluding about 5 mm of both ends thereof. Then, the specimen is grasped by an upper action grip of a UTM (Mode3343, Instron Corporation) at one end thereof not attached to the tape and is grasped by a lower action grip at a taped portion of the other end, followed by measuring a force required to peel the heat resistant porous layer off of the porous substrate, thereby finding the adhesive strength to a substrate.

Next, a method for fabricating a separator according to an example embodiment will be described. A method for fabricating a separator according to an embodiment includes preparing a heat resistant porous layer composition including the monomer, oligomer, or polymer represented by Formula 1, an initiator, and a solvent, applying the heat resistant porous layer composition to one or both surfaces of a porous substrate, followed by curing the composition to form a heat resistant porous layer.

Preparing a heat resistant porous layer composition may include mixing the monomer, oligomer, and/or polymer represented by Formula 1, the initiator, and the solvent, followed by stirring at 10° C. to 40° C. for 30 min to 5 hours. Here, mixing may be performed using a ball mill, a bead mill, or a screw mixer.

Then, a porous heat resistant layer is formed on one or both surfaces of the porous substrate using the heat resistant porous layer composition. Before forming the heat resistant porous layer, one or both surfaces of the porous substrate may be optionally subjected to post-treatment such as sulfonation treatment, graft treatment, corona discharge treatment, UV irradiation treatment, plasma treatment, or sputter etching treatment to enhance adhesion to the porous heat resistant layer. After post-treatment, the heat resistant porous layer may have, for example, an island shape or a thin-film shape.

Forming a heat resistant porous layer on the porous substrate using the heat resistant porous layer composition may be performed by any suitable method, for example, coating, lamination, and coextrusion, without being limited thereto. Examples of coating may include dip coating, die coating, roll coating, and comma coating. These methods may be used alone or in combination thereof. For example, the heat resistant porous layer of the separator may be formed by dip coating.

Then, the porous heat resistant layer may be further dried. This allows a solvent used in preparing the heat resistant porous layer composition to be volatilized. In drying, it is possible to minimize residues of the solvent in the heat resistant porous layer composition through adjustment of temperature and time. For example, drying may be performed at 80° C. to 100° C., e.g., 80° C. to 90° C. for 5 sec to 60 sec, e.g., 10 sec to 40 sec.

Thereafter, the porous heat resistant layer may be subjected to photocuring or heat curing. For example, photocuring may include UV curing and infrared curing, for example, UV curing. Photocuring may include irradiation of one surface of the porous heat resistant layer at a fluence of 500 mJ/cm$^2$ to 3000 mJ/cm$^2$, e.g., 500 mJ/cm$^2$ to 2000 mJ/cm$^2$. Irradiation may be performed for 1 min to 15 hours. After photocuring, heat treatment may be performed at a temperature of about 50° C. to about 180° C. for 1 to 10 hours to achieve uniform curing density. In addition, when the porous heat resistant layer is subjected to heat curing, heat curing may be performed at 60° C. to 120° C. for 1 to 36 hours, e.g., at 80° C. to 110° C. for 5 to 24 hours.

The heat resistant porous layer may have an overall thickness of 1 μm to 15 μm, e.g., 2 μm to 10 μm, more e.g., 2 μm to 8 μm. Within this range, the heat resistant porous layer may have a suitable thickness to obtain good thermal stability and adhesive strength, and may prevent excessive increase in thickness of the entire separator, thereby suppressing increase in internal resistance of a battery.

In accordance with another example embodiment, there is provided a rechargeable battery including: an anode; a cathode; the separator as set forth above disposed between the anode and the cathode; and an electrolyte.

For example, the rechargeable battery may be a lithium rechargeable battery such as a lithium metal rechargeable battery, a lithium ion rechargeable battery, a lithium polymer rechargeable battery, or a lithium ion polymer rechargeable battery.

An example of a method for fabricating the rechargeable battery is as follows: A separator including the heat resistant layer according to the present example embodiment is disposed between the anode and the cathode of the battery, followed by filling the battery with the electrolyte.

FIG. 1 is an exploded perspective view of a rechargeable battery according to an example embodiment. The present example embodiment will be described using a polygonal rechargeable battery by way of example, but embodiments are not limited thereto and may be used in various batteries such a lithium polymer battery, a cylindrical battery, and the like.

Referring to FIG. 1, the rechargeable battery 100 according to an example embodiment includes: an electrode assembly obtained by rolling a structure in which a separator 30 is interposed between an anode 10 and a cathode 20; and a case 50 receiving the electrode assembly 40. Here, the anode 10, the cathode 20, and the separator are impregnated with an electrolyte (not shown).

The separator 30 is as described above.

The anode 10 may include an anode current collector and an anode active material layer formed on the anode current collector. The anode active material layer may include an anode active material, a binder, and optionally a conductive material.

The anode current collector may include aluminum (Al) and nickel (Ni), without being limited thereto.

The anode active material may include a compound into, or from which, lithium ions may be reversibly intercalated or deintercalated. For example, the anode active material may include at least one selected among complex oxides or complex phosphates of lithium and a metal such as cobalt, manganese, nickel, aluminum, iron, or a combination thereof. For example, the anode active material may include a lithium-cobalt oxide, a lithium-nickel compound, a lithium-manganese oxide, a lithium-nickel-cobalt-manganese oxide, a lithium-nickel-cobalt-aluminum oxide, a lithium-iron phosphate, or a combination thereof.

The binder serves to allow particles of the anode active material to easily adhere to one another and to allow the anode active material to adhere to the anode current collector. Examples of the binder may include polyvinylalcohol, carboxymethyl cellulose, hydroxypropyl cellulose, diacetyl cellulose, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon, without being limited thereto. These may be used alone or as a mixture thereof.

The conductive material serves to impart conductivity to an electrode. Examples of the conductive material may include natural graphite, synthetic graphite, carbon black, carbon fibers, metal powder, and metal fibers, without being limited thereto. These may be used alone or as a mixture thereof. The metal powder and the metal fibers may include a metal such as copper, nickel, aluminum, silver, and the like.

The cathode 20 may include a cathode current collector and a cathode active material layer formed on the cathode current collector.

The cathode current collector may include copper (Cu), gold (Au), nickel (Ni), and a copper alloy, without being limited thereto.

The cathode active material layer may include a cathode active material, a binder, and optionally a conductive material.

The cathode active material may include a material into or from which lithium ions may be reversibly intercalated or deintercalated, metallic lithium, a metallic lithium alloy, a material capable of being doped with or dedoped from lithium, a transition metal oxide, or a combination thereof.

Examples of the material into or from which lithium ions may be reversibly intercalated or deintercalated may include carbon-based materials, for example, crystalline carbon, non-crystalline carbon, or a combination thereof. Examples of the crystalline carbon may include amorphous, plate-like, flake, spherical, or fibrous natural graphite or synthetic graphite. Examples of the non-crystalline carbon may include soft or hard carbon, mesophase pitch carbide, baked cokes, and the like. The metallic lithium alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn. Examples capable of being doped with or dedoped from lithium may include Si, $SiO_x$ (0<x<2), a Si—C composite, a Si—Y alloy, Sn, $SnO_2$, a Sn—C composite, Sn—Y, and a mixture of at least one thereof and $SiO_2$. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po and a combination thereof. Examples of the transition metal oxide may include a vanadium oxide, a lithium-vanadium oxide, and the like.

The kinds of the binder and conductive material used in the cathode are the same as those of the binder and conductive material used in the anode.

Each of the anode and the cathode may be fabricated by preparing an active material composition by mixing the active material, the binder, and optionally the conductive material in a solvent, and applying the composition to the current collector. Here, the solvent may include N-methyl pyrrolidone, without being limited thereto.

The electrolyte may include an organic solvent and a lithium salt.

The organic solvent serves as a medium through which ions involved in electrochemical reactions of a battery may be migrated. Examples of the organic solvent may include a carbonate solvent, an ester solvent, an ether solvent, a ketone solvent, an alcohol solvent, and an aprotic solvent.

Examples of the carbonate solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. For example, a carbonate solvent capable of increasing dielectric constant while exhibiting low viscosity may be prepared by mixing a chain type carbonate and an annular carbonate. Here, the annular carbonate and the chain type carbonate may be mixed in a volume ratio of 1:1 to 1:9.

Examples of the ester solvent may include methyl acetate, ethyl acetate, n-propyl acetate, dimethyl acetate, methyl propionate, ethyl propionate, γ-butyrolactone, decanolide, valerolactone, mevalonolactone, caprolactone, and the like. Examples of the ether solvent may include dibutyl ether, tetraglyme, diglyme, dimethoxy ethane, 2-methyl tetrahydrofuran, tetrahydrofuran, and the like. Examples of the ketone solvent may include cyclohexanone, and examples of the alcohol solvent may include ethyl alcohol, isopropyl alcohol, and the like.

Such organic solvents may be used alone or as a mixture thereof. When a mixture of the organic solvents is used, a mixing ratio of the organic solvents may be adjusted depending upon desired battery performance.

The lithium salt is dissolved in the organic solvent to serve as a source for lithium ions, thereby allowing basic operation of the rechargeable battery while promoting migration of lithium ions between the anode and the cathode.

Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y being a natural number), LiCl, LiI, $LiB(C_2O_4)_2$, or a combination thereof.

The concentration of the lithium salt may range from 0.1 M to 2.0 M. Within this range, the electrolyte may have an appropriate conductivity and viscosity, thereby exhibiting excellent performance to allow lithium ions to effectively migrate.

The rechargeable battery according to a further example embodiment may have a capacity retention after 100 cycles of 70% to 100%, e.g., 80% to 100%.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATIVE EXAMPLES

Preparative Example 1

Preparation of a First Solution 7 wt % of a polyvinylidene fluoride-based homopolymer (Solef 5120, Solvay Specialty Polymers) and 93 wt % of dimethyl acetamide (DMAc, Daejung Chemicals & Metals Co., Ltd.) were mixed, followed by stirring at 40° C. for 3 hours, thereby preparing a first solution.

Preparative Example 2

Preparation of a Second Solution 7 wt % of a polyvinylidene fluoride-based copolymer (KF9300, Kureha Chemicals) and 93 wt % of dimethyl acetamide (DMAc, Daejung Chemicals & Metals Co., Ltd.) were mixed, followed by stirring at 40° C. for 3 hours, thereby preparing a second solution.

Preparative Example 3

Preparation of a Third Solution 10 wt % of poly(methyl methacrylate) and 90 wt % of acetone were mixed, followed by stirring at 40° C. for 1 hour, thereby preparing a third solution.

Preparative Example 4

Preparation of an Alumina Dispersion 25 wt % of alumina having an average particle diameter ($D_{50}$) of 500 nm (LS235, Nippon Light Metal Company, Ltd.) was added to acetone, followed by dispersion using a bead mill at 25° C. for 2 hours, thereby preparing an alumina dispersion.

EXAMPLES

Example 1

Fabrication of a Separator 0.7 wt % of ethoxylated pentaerythritol tetraacrylate (PE-044, HANNONG Chemicals), 0.035 wt % of benzoyl peroxide, 6.6 wt % of the first solution prepared in Preparative Example 1, 55.4 wt % of the alumina dispersion prepared in Preparative Example 4, and 37.265 wt % of acetone were mixed, thereby preparing a heat resistant porous layer composition. The prepared composition was coated on both surfaces of a 7 μm thick polyethylene fabric (SKI) to a thickness of 2 μm, followed by drying at 80° C. for 30 seconds. Then, the coated layer was subjected to heat curing at 100° C. for 24 hours, thereby fabricating a separator having an overall thickness of about 11 μm.

Example 2

Fabrication of a Separator

A separator was fabricated in the same manner as in Example 1 except that 6.6 wt % of the second solution prepared in Preparative Example 2 was used instead of 6.6 wt % of the first solution of Example 1.

Comparative Example 1

Fabrication of a Separator

A separator was fabricated in the same manner as in Example 1 except that ethoxylated pentaerythritol tetraacrylate and benzoyl peroxide were not used, and 33.6 wt % of the first solution, 10.3 wt % of the third solution, 38.4 wt % of the alumina dispersion, and 17.7 wt % of acetone were used.

Comparative Example 2

Fabrication of a Separator

A separator was fabricated in the same manner as in Example 2 except that ethoxylated pentaerythritol tetraacrylate and benzoyl peroxide were not used, and 33.6 wt % of the second solution, 10.3 wt % of the third solution, 38.4 wt % of the alumina dispersion, and 17.7 wt % of acetone were used.

Comparative Example 3

Fabrication of a Separator

A separator was fabricated in the same manner as in Example 1 except that ethoxylated pentaerythritol tetraacrylate and benzoyl peroxide were not used, and 10.3 wt % of the first solution, 33.6 wt % of the third solution, 38.4 wt % of the alumina dispersion, and 17.7 wt % of acetone were used.

Comparative Example 4

Fabrication of a Separator

A separator was fabricated in the same manner as in Example 2 except that ethoxylated pentaerythritol tetraacrylate and benzoyl peroxide were not used, and 10.3 wt % of the second solution, 33.6 wt % of the third solution, 38.4 wt % of the alumina dispersion, and 17.7 wt % of acetone were used.

Details of each of the heat resistant porous layer compositions of Examples 1 to 2 and Comparative Examples 1 to 4 are shown in Table 1.

TABLE 1

| Unit (wt %) | Ethoxylated pentaerythritol tetraacrylate | Benzoyl peroxide | First solution | Second solution | Third solution | Alumina dispersion | Additional acetone |
|---|---|---|---|---|---|---|---|
| Example 1 | 0.7 | 0.035 | 6.6 | — | — | 55.4 | 37.265 |
| Example 2 | 0.7 | 0.035 | — | 6.6 | — | 55.4 | 37.265 |
| Comp. Ex. 1 | — | — | 33.6 | — | 10.3 | 38.4 | 17.7 |
| Comp. Ex. 2 | — | — | — | 33.6 | 10.3 | 38.4 | 17.7 |
| Comp. Ex. 3 | — | — | 10.3 | — | 33.6 | 38.4 | 17.7 |
| Comp. Ex. 4 | — | — | — | 10.3 | 33.6 | 38.4 | 17.7 |

Experimental Example

Each of the separators fabricated in Examples 1 to 2 and Comparative Examples 1 to 4 was evaluated as to fracture resistance at high temperature, tensile strength after being left at 200° C. for 10 minutes, air permeability, and adhesive strength. Results are shown in Table 2.

Fracture Resistance at High Temperature

Each of the separators fabricated in Examples 1 to 2 and Comparative Examples 1 to 4 was cut into a specimen having size of 5 cm×5 cm in the MD and TD. The specimens were fixed to a plate using an imide tape at all sides thereof, and the plate was placed in an oven (LO-FS050, Lk Lab Korea Co., Ltd.) at 200° C. for 10 minutes, followed by checking whether the separator fractured. The specimen was rated as "fail" when suffering from fracture and rated as "pass" when not suffering from fracture.

Tensile Strength after being Left at 200° C. for 10 Minutes

Each of the separators fabricated in Examples 1 to 2 and Comparative Examples 1 to 4 was cut into a specimen having size of 5 cm×5 cm in the MD and TD. The specimens were fixed to a plate using an imide tape at all sides thereof, and the plate was placed in an oven (LO-FS050, Lk Lab Korea Co., Ltd.) at 200° C. for 10 minutes, followed by measuring tensile strength using a tensile strength tester (3343, Instron Corporation).

Air Permeability

Each of the separators fabricated in Examples 1 to 2 and Comparative Examples 1 to 4 was cut into a specimen having size of 100 mm×100 mm in the MD and TD, followed by measuring the time that it takes 100 cc of air to pass through the specimen using an air permeability tester (EG01-55-1MR, Asahi Seiko Co., Ltd.), thereby finding air permeability.

Adhesive Strength to a Substrate

Each of the separators fabricated in Examples 1 to 2 and Comparative Examples 1 to 4 was cut into a specimen having size of 1.2 cm (MD)×5 cm (TD), and the specimen was attached to a tape (Scotch, 3M Co., Ltd.) excluding about 5 mm of both ends thereof. Then, the specimen was grasped by an upper action grip of an UTM (Mode 3343, Instron Corporation) at one of both ends thereof not attached to the tape and was grasped by a lower action grip at a taped portion of the other end, followed by measuring a force required to peel off the heat resistant porous layer from the porous substrate, thereby finding adhesive strength to a substrate.

Thermal Shrinkage

Each of the separators fabricated in Examples 1 to 2 and Comparative Examples 1 to 4 was cut into a specimen having size of 10 cm×10 cm in the MD and TD, followed by marking dots at the center of the specimen and at points distanced 50 mm from the center in the MD and the TD, respectively. The specimens were left in an oven (LO-FS050, Lk Lab Korea Co., Ltd.) at 150° C. for 1 hour, followed by measuring the distances between the marked dots, thereby calculating thermal shrinkage in the MD and the TD.

TABLE 2

|  | Fracture resistance at high temperature | Tensile strength (kgf/cm$^2$) @ 200° C., 10 min | | Air permeability | Adhesive strength to substrate | Thermal shrinkage (%) | |
|---|---|---|---|---|---|---|---|
|  | (pass/fail) | MD | TD | (sec/100 cc) | (N) | MD | TD |
| Example 1 | Pass | 160 | 300 | 131 | 0.3 | 5 | 3 |
| Example 2 | Pass | 150 | 303 | 157 | 1.8 | 5 | 1 |
| Comp. Ex. 1 | Fail | Unmeasurable | | 250 | 0.7 | 15 | 9 |
| Comp. Ex. 2 | Fail | Unmeasurable | | 268 | 0.3 | 15 | 8 |
| Comp. Ex. 3 | Fail | Unmeasurable | | 170 | 0.2 | 17 | 8 |
| Comp. Ex. 4 | Fail | Unmeasurable | | 180 | 0.2 | 16 | 8 |

As shown in Table 2, it may be seen that the separators of Examples 1 to 2 including the crosslinked binder formed from the monomer, oligomer, or polymer represented by Formula 1 had a tensile strength of 50 kgf/cm$^2$ to 350 kgf/cm$^2$, as measured after being left at 200° C. for 10 minutes, did not suffer from fracture even at a high temperature of 200° C., and exhibited a thermal shrinkage of 10% or less and thus excellent heat resistance. Conversely, the separators of Comparative Examples 1 to 4 suffered from severe fracture, making measurement of tensile strength impossible, at a high temperature of 200° C.

By way of summation and review, upon short circuit of a battery, high current flows therethrough while generating heat, thereby causing increase in temperature of the battery. Thermal runaway may occur. As a result, an electrolyte may evaporate or be heated, causing a safety valve to be operated or the battery to catch fire. Accordingly, consideration has been given to using a separator including a porous structure formed of a heat-meltable resin, in which the separator provides shutdown properties, i.e. melts, at a predetermined temperature or more to allow pores to be blocked (shutdown), thereby stopping reactions in a battery and suppressing heat generation.

A large rechargeable battery may have poor heat dissipation as compared with a smaller one and may generate an increased amount of heat, which may cause the internal temperature of the battery to be increased to a temperature of 200° C. or more in a few seconds. In this case, a separator formed of a heat-meltable resin may not only melt may melt down. Meltdown of the separator may allow the electrodes to contact each other, such that a short circuit current flows through the battery. Thus, the battery may continually generate heat, which may lead to thermal runaway and/or an explosion.

As described above, embodiments relate to a heat resistant porous layer composition having high heat resistance, a separator formed from the heat resistant porous layer composition and having excellent fracture resistance at high temperature, an electrochemical battery using the separator, and a method for fabricating the separator.

Embodiments may provide a separator that may maintain its form without being fractured even in an environment in which the internal temperature of a battery is increased to 200° C. or more in a few seconds while exhibiting excellent adhesion, and an electrochemical battery using the same According to an embodiment, the separator may exhibit excellent properties in terms of fracture resistance at high temperature, tensile strength after being left at 200° C. for 10 minutes, and thermal shrinkage. The separator may not be fractured even when the battery is charged/discharged for a long time. A battery fabricated using the separator may exhibit high-efficiency charge/discharge properties and may avoid deterioration in performance. In addition, the separator may have excellent air permeability and adhesion to a substrate, which may enhance battery performance, such as battery reliability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise e.g., indicated. Accordingly, it will be understood by those of skill in the art that various changes in form and details may be made without departing from the spirit and scope of the present example embodiment as set forth in the following claims.

What is claimed is:

1. A heat resistant porous layer composition for a separator of an electrochemical battery, the composition consisting essentially of:

at least one of a compound represented by Formula 1, an oligomer or a polymer of the compound, and a combination thereof, an initiator, a non-crosslinkable binder resin, and a solvent, or at least one of the compound represented by Formula 1, an oligomer or a polymer of the compound, and a combination thereof, the initiator, the non-crosslinkable binder resin, inorganic particles, and the solvent,

[Formula 1]

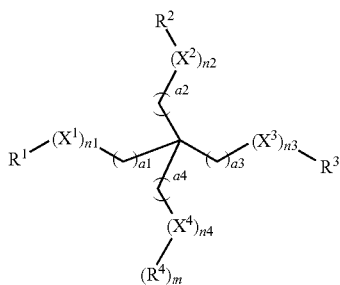

wherein, in Formula 1, $X^1$ to $X^3$ are each independently an oxyethylene group, $X^4$ is an oxyethylene group or a $C_1$ to $C_{10}$ alkyl group, $R^1$ to $R^4$ are each independently a (meth)acrylate group, a hydroxy group, a carboxyl group, an ester group, a cyanate group, an isocyanate group, an amino group, a thiol group, a $C_1$ to $C_{10}$ alkoxy group, a vinyl group, or a heterocyclic group, $a^1$ to $a^4$ are each independently an integer from 1 to 10, and $n^1$ to $n^3$ are each independently an integer from 0 to 10, at least one of $n^1$ to $n^4$ being an integer from 1 to 10, provided that, when $X^4$ is an oxyethylene group, $n^4$ is an integer from 1 to 10 and m is 1, and when $X^4$ is a $C_1$ to $C_{10}$ alkyl group, $n^4$ is 1 and m is 0, and wherein the non-crosslinkable binder resin includes one or more of a polyvinylidene fluoride (PVdF)-based polymer, a polymethylmethacrylate, a polyacrylonitrile, a polyvinylpyrrolidone, a polyvinylacetate, a polyethylene oxide, a cellulose acetate, a cellulose acetate butyrate, a cellulose acetate propionate, a cyanoethylpullulan, a cyanoethylpolyvinylalcohol, a cyanoethylcellulose, a cyanoethylsucrose, a pullulan, or an acrylonitrile-butadiene-styrene copolymer.

2. The composition as claimed in claim 1, wherein the composition consists essentially of the compound represented by Formula 1, the initiator, the non-crosslinkable binder resin, the inorganic particles, and the solvent, wherein the inorganic particles are present in an amount of 50 wt % to 95 wt % based on the total weight of the composition in terms of solid content.

3. The composition as claimed in claim 1, wherein the polyvinylidene fluoride (PVdF)-based polymer includes one or more of a PVdF-based homopolymer or a PVdF-hexafluoropropylene-based PVdf-hexafluoropropylene-based copolymer.

4. The composition as claimed in claim 1, wherein a weight ratio of the compound represented by Formula 1 to the non-crosslinkable binder resin ranges from 8:2 to 2:8.

5. A separator for an electrochemical battery, the separator comprising:
a porous substrate; and
a heat resistant porous layer formed on one or both surfaces of the porous substrate using the composition as claimed in claim 1.

6. A separator for an electrochemical battery, the separator comprising:
a porous substrate; and
a heat resistant porous layer formed on one or both surfaces of the porous substrate, wherein:
the heat resistant porous layer includes a crosslinked binder, the heat resistant porous layer being formed using the composition as claimed in claim 1, and
the separator has a tensile strength of 50 kgf/cm² to 350 kgf/cm², as measured after being left at 200° C. for 10 minutes.

7. The separator as claimed in claim 6, wherein the separator does not suffer from fracture after being left at 200° C. for 10 minutes.

8. The separator as claimed in claim 6, wherein the crosslinked binder is formed from the compound represented by Formula 1.

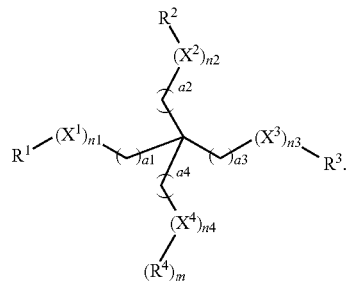

9. The separator as claimed in claim 6, wherein the composition consists essentially of the compound represented by Formula 1, the initiator, the non-crosslinkable binder resin, the inorganic particles, and the solvent, and wherein the inorganic particles being present in an amount of 50 wt % to 95 wt % based on the total weight of the heat resistant porous layer.

10. The separator as claimed in claim 6, wherein the non-crosslinkable binder resin includes one or more of a PVdF-based polyvinylidene fluoride (PVdF)-based homopolymer or a PVdF-hexafluoropropylene-based polyvinylidene fluoride-hexafluoropropylene (PVdF-HFP)-based copolymer.

11. The separator as claimed in claim 6, wherein the separator has an air permeability of 300 sec/100 cc or less.

12. The separator as claimed in claim 6, wherein the separator has an adhesive strength to the porous substrate of 0.1 N or more.

13. The separator as claimed in claim 6, wherein the separator has a thermal shrinkage of 10% or less in the MD and the TD, as measured after being left at 150° C. for 60 minutes.

14. An electrochemical battery, comprising: an anode; a cathode; a separator; and an electrolyte, the separator being the separator as claimed in claim 6.

15. A method for fabricating a separator for an electrochemical battery, the method comprising coating the composition as claimed in claim 1 onto one or both surfaces of a porous substrate, followed by curing the composition to form a heat resistant porous layer.

* * * * *